United States Patent
Bhamra

(10) Patent No.: US 10,186,243 B2
(45) Date of Patent: Jan. 22, 2019

(54) PERCUSSION INSTRUMENT

(71) Applicant: Kuljit Bhamra, Southall (GB)

(72) Inventor: Kuljit Bhamra, Southall (GB)

(*) Notice: Subject to any disclaimer, the term of this patent is extended or adjusted under 35 U.S.C. 154(b) by 0 days.

(21) Appl. No.: 15/548,933

(22) PCT Filed: Feb. 8, 2016

(86) PCT No.: PCT/GB2016/000027
§ 371 (c)(1),
(2) Date: Aug. 4, 2017

(87) PCT Pub. No.: WO2016/124885
PCT Pub. Date: Aug. 11, 2016

(65) Prior Publication Data
US 2018/0025711 A1  Jan. 25, 2018

(30) Foreign Application Priority Data

Feb. 6, 2015 (GB) .................................. 1502012.6
Feb. 19, 2015 (GB) .................................. 1502827.7

(51) Int. Cl.
| | |
|---|---|
| G10H 1/00 | (2006.01) |
| G10H 5/00 | (2006.01) |
| G06F 3/0354 | (2013.01) |
| G06F 3/044 | (2006.01) |
| G10D 13/02 | (2006.01) |
| G10H 3/14 | (2006.01) |

(52) U.S. Cl.
CPC ....... *G10H 1/0066* (2013.01); *G06F 3/03547* (2013.01); *G06F 3/044* (2013.01); *G10D 13/024* (2013.01); *G10H 1/00* (2013.01); *G10H 3/146* (2013.01); *G10H 5/00* (2013.01); *G10H 5/002* (2013.01); *G10H 2230/281* (2013.01)

(58) Field of Classification Search
CPC ... G06F 3/03547; G06F 3/044; G10H 1/0066; G10H 3/146; G10H 5/002; G10H 2230/281; G10D 13/024
USPC ........................................................ 84/600
See application file for complete search history.

(56) References Cited

U.S. PATENT DOCUMENTS

| | | | | |
|---|---|---|---|---|
| 4,479,412 A | * | 10/1984 | Klynas | ................... G10H 3/143 84/730 |
| 5,115,706 A | | 5/1992 | Aluisi | |
| 5,288,938 A | * | 2/1994 | Wheaton | ............ G06K 9/00335 84/600 |

(Continued)

OTHER PUBLICATIONS

United Kingdom Intellectual Property Office, Search Report issued in corresponding Application No. GB1502012.6 dated Jul. 24, 2015.

*Primary Examiner* — Jeffrey Donels
(74) *Attorney, Agent, or Firm* — Stites & Harbison, PLLC; David W. Nagle, Jr.

(57) ABSTRACT

An electronic percussion instrument comprising a pair of drum assemblies of each of different tone. Each drum assembly is mounted on a housing and comprises a drum head having a sensor responsive to touch and/or pressure and an analog-to-digital converter to generate an electronic signal indicative of said touch and/or pressure. The electronic signal is transmitted to a processing unit which analyzes it and generates an output signal. The output signal is transmitted to a sound card which reproduces a sound representative of a drumbeat based on the output signal.

14 Claims, 9 Drawing Sheets

(56) References Cited

U.S. PATENT DOCUMENTS

| | | | |
|---|---|---|---|
| 5,531,148 A | 7/1996 | Wilson | |
| 5,801,320 A | 9/1998 | Segan et al. | |
| 8,809,665 B2* | 8/2014 | Patterson | G06F 3/04883 |
| | | | 84/615 |
| 9,721,553 B2* | 8/2017 | McMillen | G10H 3/146 |
| 9,779,710 B2* | 10/2017 | Yu | G10H 3/146 |
| 2002/0062726 A1* | 5/2002 | Abe | G10H 1/0016 |
| | | | 84/464 A |
| 2007/0221040 A1 | 9/2007 | Bailey | |
| 2010/0064880 A1 | 3/2010 | Takehisa et al. | |
| 2013/0152768 A1* | 6/2013 | Rapp | G10H 3/125 |
| | | | 84/634 |
| 2014/0116229 A1 | 5/2014 | Mori | |
| 2015/0059559 A1* | 3/2015 | Takasaki | G10H 3/146 |
| | | | 84/615 |
| 2017/0110103 A1* | 4/2017 | McMillen | G01L 1/18 |

\* cited by examiner

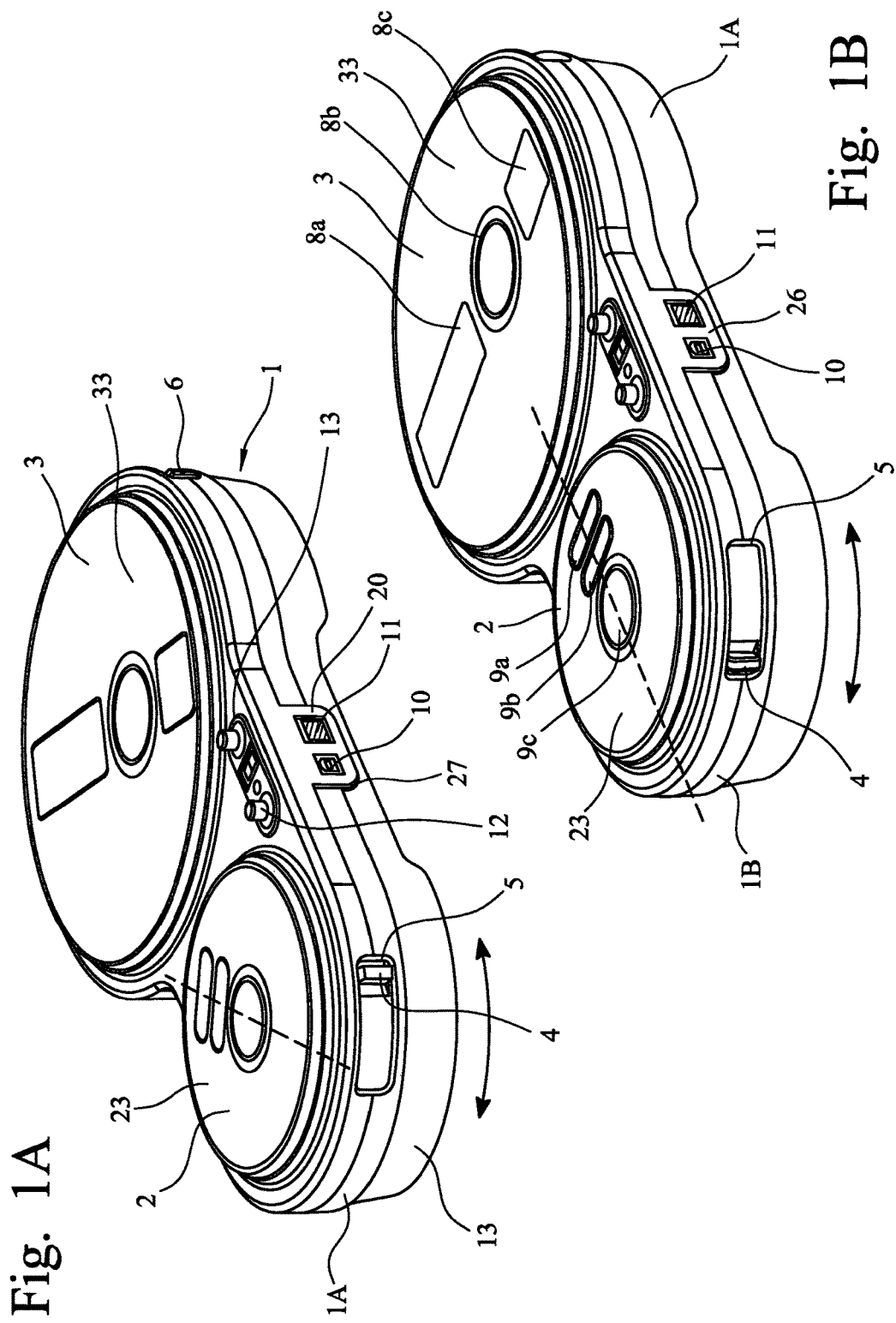

PERCUSSION INSTRUMENT

The present invention relates to an electronic percussion instrument comprising two drums of differing size.

A traditional Indian percussion instrument comprises a two drum set known as a tabla. A tabla consists of a drum set formed of two drums, a smaller, treble drum called a dayan having a hollow generally shell-shaped body formed typically of wood, and a larger, bass drum called a bayan having a hollow body formed of a harder material typically in the form of a metal such as copper, brass or sometimes steel or terracotta. Such a percussion instrument, i.e. an instrument comprising a treble drum and a bass drum, will hereinafter be referred to as a tabla. Traditional tabla drum heads are formed of a main layer of goatskin which is stretched over the open end of the drum. An outer ring of secondary skin is overlaid on the main layer skin for suppressing some of the natural overtones. The skins are bound together with a woven braid which allows the assembled skins to be stretched over the hollow body. The skin assembly is secured to the shell by means of straps formed of strips of camel or cow hide; these straps are laced between the braid of the head assembly and another ring made from the same strap material placed on the base of the drum. The strap tension and hence the drum head tension, is adjustable to tune the drum. In addition, each drum head has a coated central area made by applying multiple layers of a paste consisting of rice or wheat starch mixed with a black powder of various origins. The precise construction and shaping of this coated central area modifies each drum's natural overtones.

The tabla tuning range is limited and therefore different size drums, each with a different range, are produced. To tune a specific drum, wood cylinders, known as ghatta, are inserted by hand between the highly tensioned straps and the shell to allow tension to be adjusted by the relative positioning of the wood cylinders. Fine tuning is then achieved by applying a force on the braided portion of the head using a small and heavy hammer.

Tabla drum sets are, by virtue of their nature and construction, made by hand by skilled craftsmen. Construction takes a considerable amount of time and is inevitably very expensive. A further expense occurs in practice because the tabla are sold in sets of two so that if one drum is damaged it is necessary to buy a new set. Tabla drums are not particularly robust and although repairs can be made to such drums this, again, is expensive because of the necessity to use skilled craftsmen. In addition, by virtue of the materials used and the method of construction, tabla sets are likely to be damaged or weakened by humidity, pressure changes and other environmental circumstances. The paste on the central area of each drum head is also extremely fragile; as such if the central area is impacted by a drum stick or other hard object, the paste crumbles which immediately renders the drum unplayable. In addition, the absence of an industry standardised drum head-size means that replacement skins may only be sourced from the respective maker of the drum set. Further, all drum makers are based in India and Pakistan and have their own uniquely sized drums.

Even if a user manages to source a drum head skin, changing of the drum head skins involves unthreading ten meters or so of tensioning gut straps, and is an extremely arduous and time-consuming task which can only be performed by specialists.

Moreover, because of the precise construction of the instrument, even if the tabla is undamaged, tuning requires substantial skill. As a result, tabla playing is only accessible to a very limited number of people.

In light of the foregoing traditional tabla drums are not suited for use outside a circle of experts which cannot teach the art of tabla drumming in the educational sector because of the expense and the relative ease with which the drum sets can be damaged by unskilled pupils.

The present invention seeks to provide an electronic percussion instrument which emulates a traditional tabla drum set and which is also more durable than the traditional tabla. Further, the present invention seeks to provide an instrument which is relatively inexpensive to make.

According to the present invention there is provided an electronic percussion instrument comprising two drum assemblies of differing tone, each drum assembly mounted on a housing, each drum assembly comprising a drum head having a sensor responsive to touch and/or pressure and an analog-to-digital converter arranged to generate an electronic signal indicative of said touch and/or pressure; a processing unit arranged to analyse the electronic signal and create an output signal; and a sound card arranged to reproduce a sound representative of a drumbeat based on the output signal.

Advantageously, the electronic percussion instrument is a tabla.

In a preferred embodiment, the sensor is a sensor membrane arranged to cover the drum head so as to detect the radial position and force of a stroke on the drum head.

Preferably, the sensor is demarcated by sensor trigger zones. In a further embodiment, one of the drum heads further comprises at least one further sensor.

Advantageously, the processing unit comprises software adapted to analyse the location and/or force and/or duration of a stroke detected by the sensor or sensors.

In a preferred embodiment, the drum assemblies are interconnected. More preferably, the drum assemblies are physically interconnected or, alternatively, interconnected by a wireless connection. In a further preferred embodiment, the percussion instrument further comprises a housing arranged to receive the two drum assemblies and form an integral unit.

Preferably, the drum heads are pivotable about a substantially vertical axis relative to the drum assemblies to enable the position of the touch sensitive areas to be moved relative to a user. In a further preferred embodiment, the drum heads are at an angle from the horizontal plane.

In another preferred embodiment, the pitch of the electronic signal is adjustable to allow the sound to be reproduced in a selected one of different keys.

Advantageously, the percussion instrument further comprises outlet ports for connecting the output of the electronic signals to headphones, loudspeakers, a computer, memory card and/or a network.

Preferably, the percussion instrument further comprises a rechargeable battery and an electrical connector arranged to enable the percussion instrument to be connected to a base station and/or a second percussion instrument.

According to a second aspect of the present invention there is provided a base station having an electrical connector arranged to be connected with an electronic percussion instrument according to the first aspect of the invention.

Preferred embodiments of the present invention will now be described by way of example with reference to the accompanying drawings, in which:

FIGS. 1A and 1B are perspective views of an electronic drum according to a first embodiment of the present invention in the form of a tabla;

In the drawings, like parts are denoted by like reference numerals.

Figure 2A:
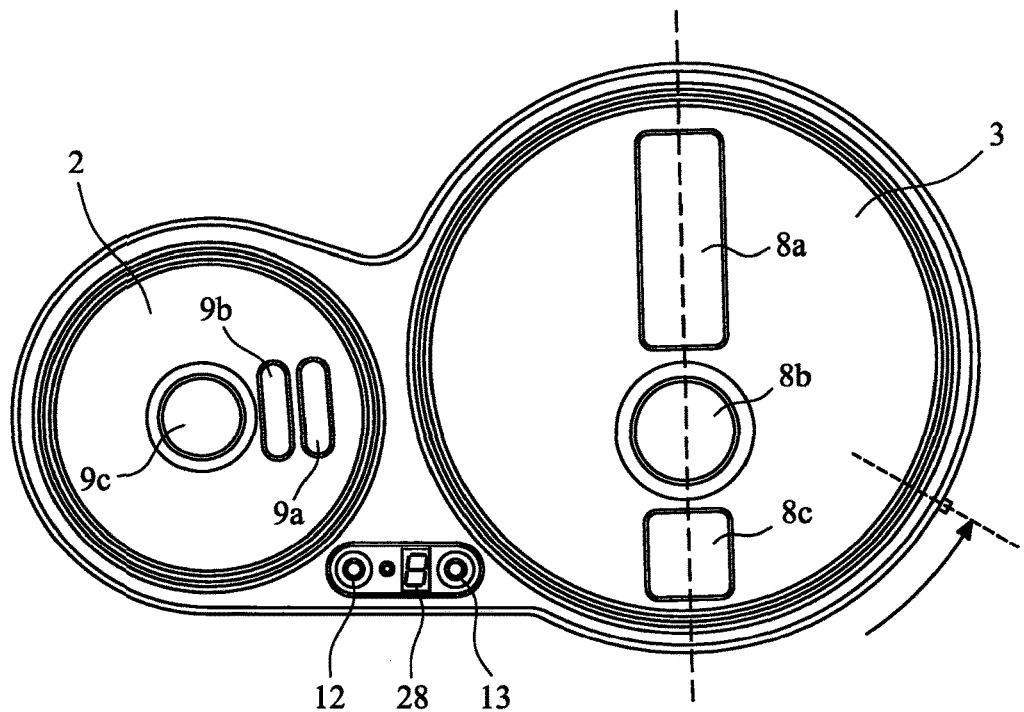
FIGS. 2A and 2B are plan views of the electronic drum illustrated in FIGS. 1A and 1B.

FIGS. 1A and 1B illustrate a perspective view of a percussion instrument in the form of an electronic version of a twin drum tabla. The instrument comprises a housing 1 formed by a lower housing member 1A and an upper housing member 1B. The upper and lower housing members 1A, 1B are complementary and form a housing 1 generally shaped as a figure-of-eight in plan view, the housing having a base, a continuous side wall and an upper surface. When the housing 1 is assembled, the lower and upper housing members 1A are held in cooperating engagement. The upper housing member 1B comprises a projecting element 26 arranged to fit into a groove 27 in the lower housing member 1A. Each housing member 1A, 1B comprises a first and second corresponding indentations arranged to form a first slot 5 and second slot 7. Each slot 5, 7 is located on opposite sides of a same plane of the side wall when the housing 1 is assembled. Drum head assemblies 2, 3 are mounted on the upper surface of the housing 1. The first and second drum head assemblies 2, 3 are of different sizes. The smaller drum head assembly 2 comprises a treble drum head and the second, larger, drum head assembly 3 comprises a bass drum. The drum heads 2, 3 are mounted on the housing 1 so as to be pivotable about a substantially vertical axis through a degree of movement determined, on the smaller drum head 2, by a lever 4 secured to the underside of the drum head which projects through the first slot 5 in the side of the housing 1, the length of the slot 5 determining the degree of angular movement. In a similar manner, the larger drum head 3 has a lever 6 which projects through the second slot 7 in the housing to determine the degree of angular movement of the larger drum head 3.

FIG. 1A shows the smaller drum head 2 pivoted as far as it can move in the anticlockwise direction with the lever 4 for abutting the right-hand end of the slot 5. By manually pushing the lever 4 clockwise, the drum head 2 can be pivoted to the position shown in FIG. 1B when the lever 4 abuts against the other end of the slot 5. Similarly, the larger drum head 3 is shown in FIG. 1A with the drum head 3 pivoted as far clockwise as its slot 7 will allow, while FIG. 1B shows the drum head 3 pivoted anticlockwise as far as allowed by the slot 7.

Each drum head 2, 3 comprises a protective cover 23, 33 having displays which define sensor trigger zones or playing areas 8A-8C, 9A-9C that demarcate a plurality of touch and force activated sensors described in detail in relation to FIGS. 3A and 3B below. The sensor trigger zones or playing areas 8A-8C, 9A-9C may be changed for alternative types to alter the characteristics of the tabla. In this embodiment, the protective covers are printed polypropylene sheets.

The housing 1 includes ports for a telephone line or computer line 10 and a socket 11 for headphones or external speakers. The ports are provided on the projecting element 26. In other embodiments it is envisaged that the instrument may include internal speakers. In addition, the upper surface of the housing 1 includes a pair of rotary dials 12, 13 to control the two drum head assemblies 2, 3. In this embodiment, the first controller 12 is adapted to regulate volume while the second controller 13 is adapted to allow fine tuning of the treble and bass drums.

Figure 2B:
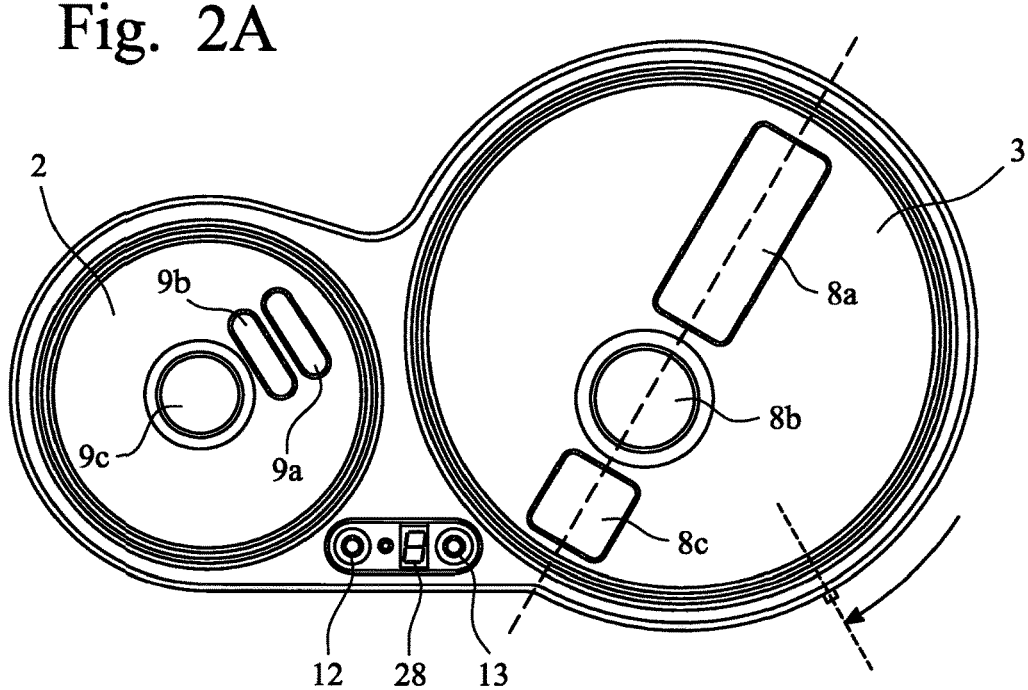

FIGS. 2A and 2B show plan views respectively of FIGS. 1A and 1B showing the drum heads in different positions. The playing areas 8A-8C, 9A-9C are positioned on the drum head 2, 3 surface to replicate the conventional striking positions of a traditional tabla. Further, the playing areas 8A-8C, 9A-9C are located so as to be easily contacted by a hand when said hand is held in its natural playing position. As illustrated by FIGS. 2A and 2B the drum heads 2, 3 can be pivoted to suit the particular orientation and/or size of the hands of a user. An LCD screen 28 is provided between the controllers 12, 13 on the upper surface of the housing 1. In use, the LCD screen 28 allows a user to identify settings and options being used.

It should be noted that in the embodiment described herein, the drum heads 2, 3 are adjustable to suit individual playing position. In addition, the rotatable drum heads allow people with different sizes of hands to play the same instrument; accordingly, a child may simply rotate the drum head into the appropriate position to use the electronic drum. Moreover, the present device has a reversible layout to allow left and/or right handed users to play. It should also be noted that the sensors are positioned to replicate the setting of conventional tabla drum heads. As a result, a player should be able to learn the first principles of the instrument in the electronic drum but progress to a conventional set of drums if necessary and/or desired.

Figure 3:
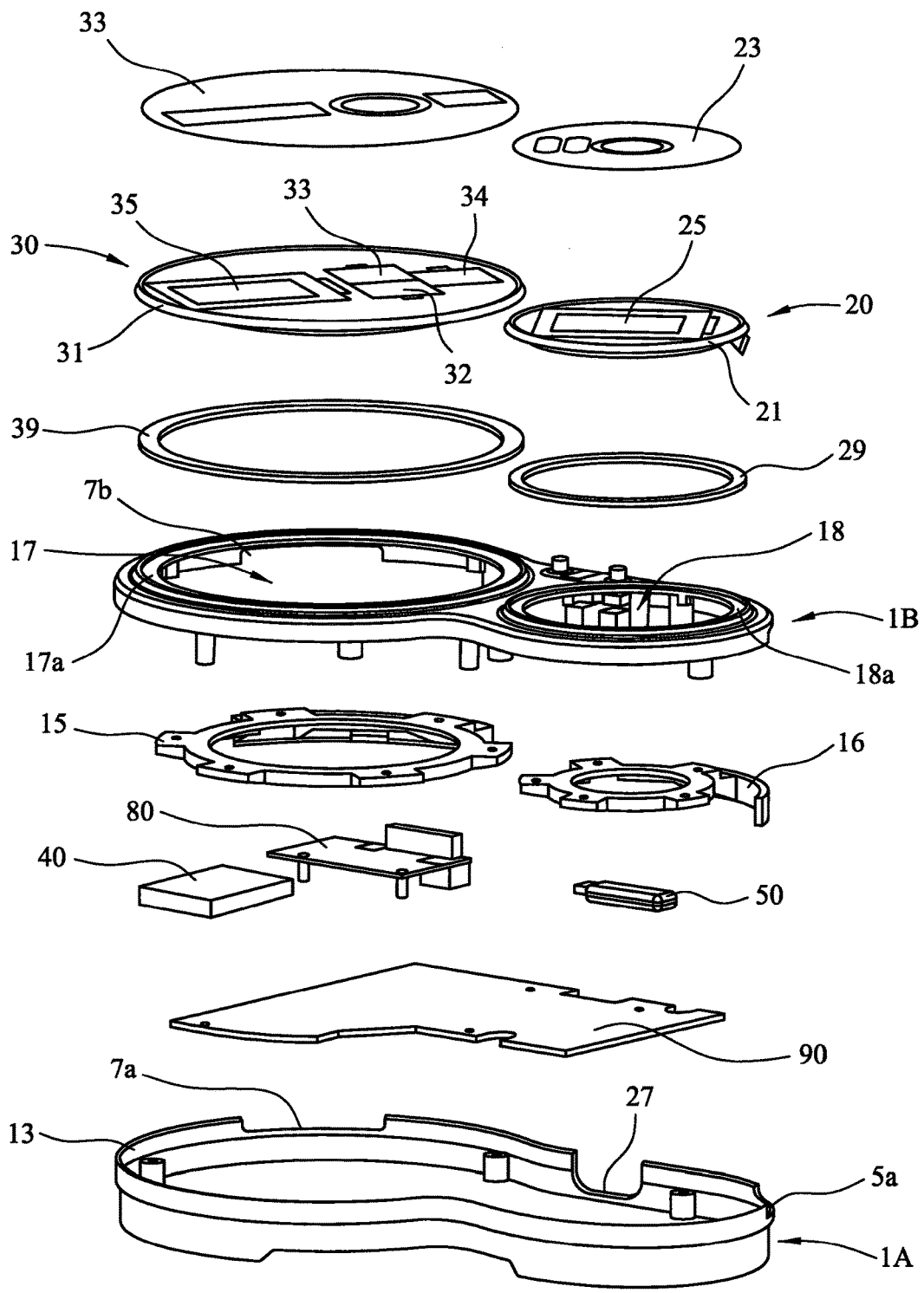
FIG. 3 is an exploded view of the main components of the electronic drum shown in the previous figures.

Referring now to FIG. 3 there is shown an exploded view of the tabla which shows that the housing 1 has a lower housing member 1A and an upper housing member 1B. On the upper face of the upper housing member 1B there are provided a first opening 17 and a second opening 18 arranged to receive the drum head assemblies 2, 3. The edge of each wall defining the first and second openings 17, 18 has a peripheral recess 17a, 18a arranged to receive a damping ring 29, 39 in the form of a neoprene foam ring. Each drum head assembly 2, 3 comprises a base unit 20, 30 shaped as a generally circular disc. Each base unit has on its underside a peripheral shoulder 21, 31 arranged to rest on the neoprene ring 29, 39 when the drum head assemblies 2, 3 are constructed. Sensors 25, 32-35 are provided on an upper surface of respective base units 20, 30 so that in use said sensors 25, 32-35 are located under corresponding playing areas 8A-8C, 9A-9C in the protective covers 23, 33. In this embodiment, the sensors 25, 32-35 are force activated sensors arranged to be tuned by electronic circuitry to provide the desired output sound. Protective covers 23, 33 are fastened to the base units 20, 30 by means of double sided pressure sensitive adhesive tape. The base units 20, 30 are secured to drum head positioning rings 15, 16. Each drum head positioning ring 15, 16 is connected to a corresponding lever 4, 6 and has cooperating surfaces arranged to rotatably engage the lower housing member 1A so that pivotal movement of the drum head positioning rings 15, 16 actuated by a corresponding lever 4, 6 causes the base units 20, 30 to pivot about a vertical axis relative to the base of the housing 1.

Electronic components are mounted on a mounting board for electrical components 90 provided between an inner surface of the lower housing member 1A and the positioning rings 15, 16. The main electronic components include an analog-to-digital converter 40, a single board micro-computer or processing unit 80 and an external sound card 50 arranged to be connected to the headphone output socket. Operation of the main electronic components will be described in relation to FIG. 4B below.

The lower housing member 1A comprises two indentations 5a, 7a which form the lower part of slots 5, 7 while the upper housing member 1B comprises two indentations 5b, 7b which form the upper part of slots 5, 7. When assembled, corresponding indentations 5a and 5b, 7a and 7b, define the slots 5, 7. The lower housing member 1A further comprises arcuate ledges 13, 14 respectively designed to support respective drum head positioning rings 15, 16 which carry the levers 4, 6.

Figure 4:
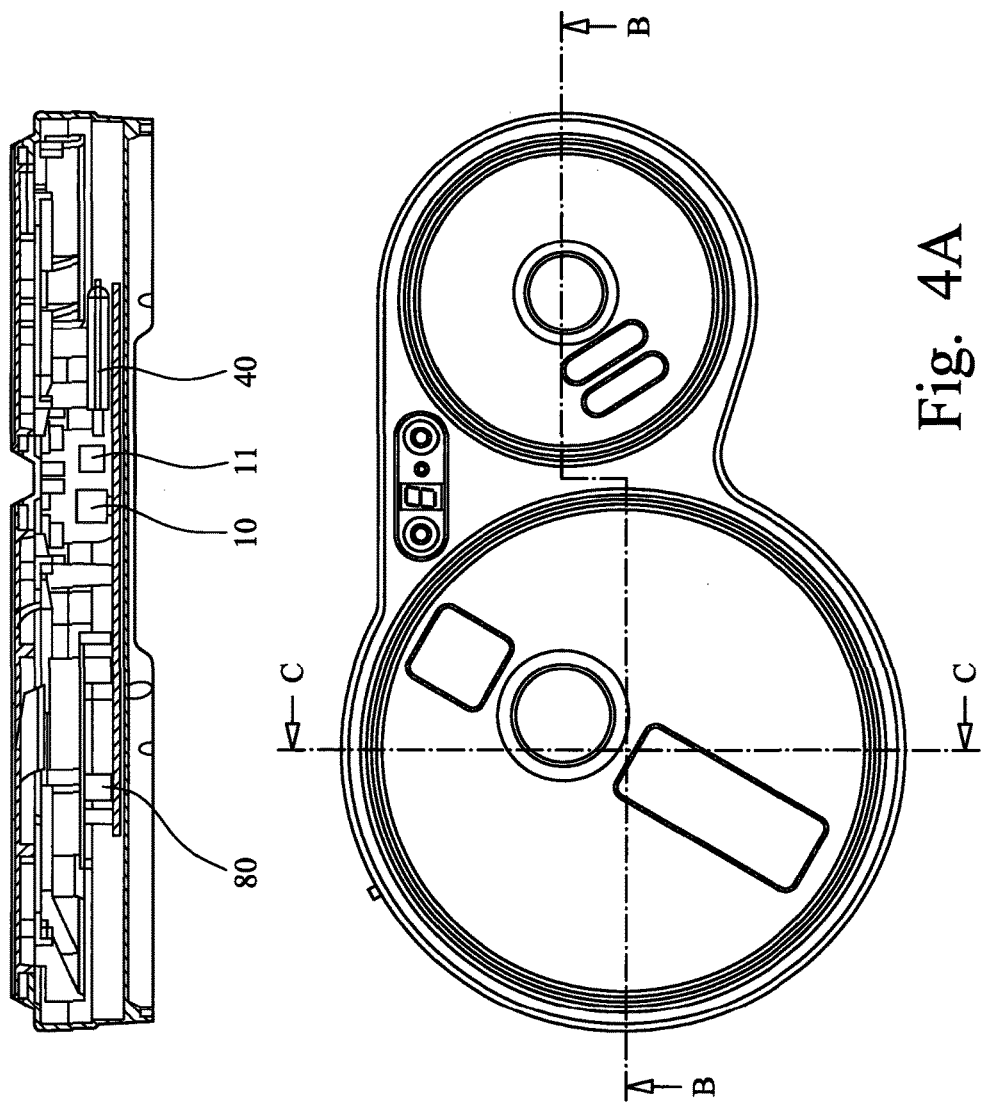
FIG. 4A is a plan view of the electronic drum of the present invention including the main electronic components of the electronic drum shown in the previous figures.
FIG. 4B is a cross-sectional view along the line B-B in FIG. 4A.
FIG. 4C is a cross-sectional view along the line C-C in FIG. 4A.

As shown in FIG. 4A, the assembled electronic percussion instrument is generally shaped as a figure of eight having, in this plan view, a smaller loop on the right side which corresponds to the treble drum and a larger loop on the left side which corresponds to the bass drum. The axes of the circumferences defining each drum are offset. The front side of the instrument is contoured while the rear portion of the instrument has a contoured portion corresponding to the top of the bass drum and a generally straight wall. The controllers 12, 13 and LCD screen 28 are provided in the top portion of the instrument between the drum head assemblies 2, 3.

As shown in FIG. 4B, when the electronic percussion instrument is assembled, the electronic components including the, circuit board, USB soundcard and processing unit are sandwiched between the positioning rings and an inner surface of the lower housing member 1A. In use, when the sensors are activated by pressure and/or touch, in other words force is applied on the sensor triggering zones located in each drum head, the sensors generate an electronic signal or signals which include information in respect of force and location of the beat. This signal or these signals are converted from analogue to digital format by the analog-to-digital converter 40 and are transmitted to the single board micro-computer 80 which selects a corresponding sound sample from a pre-recorded sound bank provided in its memory. The sound sample is further modified by the micro-computer 80 based on the position and force of the original input. In other words, a further modified electronic signal or output signal which includes a correlation between force and strength of a sound and between location of the trigger and pitch of a sound is generated. This further modified electronic signal is then transmitted to the sound card 50 which amplifies the signal to a level suitable for output to the headphone port. The output is representative of a drumbeat and has said predetermined pitch and strength. Circuits, cables and connections have been omitted for the sake of simplicity but it should be clear that any suitable arrangement can be used.

In this exemplary embodiment, the instrument is also programmed to reproduce pre-recorded vocal sounds indicative of the type of stroke used on the drum. When traditional tabla is taught, the user learns to associate certain names which correlate exactly to stroke positions on a drum. For example: "Na" corresponds to a stroke performed with a forefinger on the extreme edge of the smaller drum, "Ta" relates to a stroke performed with a finger towards the centre of the smaller drum, "Tun" corresponds to a stroke performed with a finger exactly in the centre of the smaller drum. These sounds are known as "open" sounds resulting from the drum head being allowed to resonate freely. "Ti" and "Te" are "closed" sounds produced by holding down one and two fingers respectively in the centre of the smaller drum to dampen the sound produced by a stroke. Similar terms exist for the bigger drum and combined sounds. This feature allows students to learn by using traditional methods. It also helps users understand the way that sounds are taught orally in the traditional manner. In addition, this feature allows users to learn patterns, such as "Na Ti Te Dha Ghe", and to play these patterns on the electronic instrument. The controllers allow a user to switch between different modes so that, for example, only electronically sampled sounds, pre-recorded vocal sounds or both are produced by the instrument.

As can be seen in FIG. 4C the electronic components and the drum assemblies are mounted on the housing and fit compactly therein. Moreover, the cross-section of the instrument is generally flat and, as a result, instruments can be neatly stacked over one another.

Although the embodiment described has a specific number of sensor boards mounted on each drum head it is possible that a sensor array consisting of a large number of sensors could be disposed over substantially the whole of the drum head. In further developments of the invention, it is possible that the drum heads be mounted on gimbals to enable the surface of the drum heads to be inclined during playing to accommodate the particular style and characteristics of the musician's hands. It is also possible that the pivotal movement of the drum heads may be controlled by an electric motor and the accompanying electrical circuitry could include a database remembering the preferred positions for particular users. Although the embodiment described as a one-piece housing it is possible that the two drums could be mounted on separate housings joined together by a wireless connection such as BLUETOOTH®.

One of the main advantages of the present invention is that it allows a user to tune the instrument or change keys by simply using a control dial and an LCD display. Further, the device is much more durable than a traditional tabla and is also stackable and lightweight. As a result, the electronic drum of the present invention is suitable for pedagogic use.

The electronic instrument of the present invention may be provided with a power socket to connect to a power supply unit (adapter or charger unit could be used equally) and/or may be battery operated. It should be apparent to those skilled in the art that any battery used may be rechargeable.

Although the instrument described herein has been described as having a pair of separate controllers for each drum head, a single controller for both drum heads may also be provided. In addition, the device could be arranged to reproduce speech sounds which call out trigger zone names, preferably in Hindi and/or English. These sounds may be reproduced individually or may be overlaid with the drum sounds. In yet another embodiment, the electronic drum may incorporate a drone synthesiser and associated settings. A separate volume control may be provided for drone and/or voice over functions.

Figure 5:
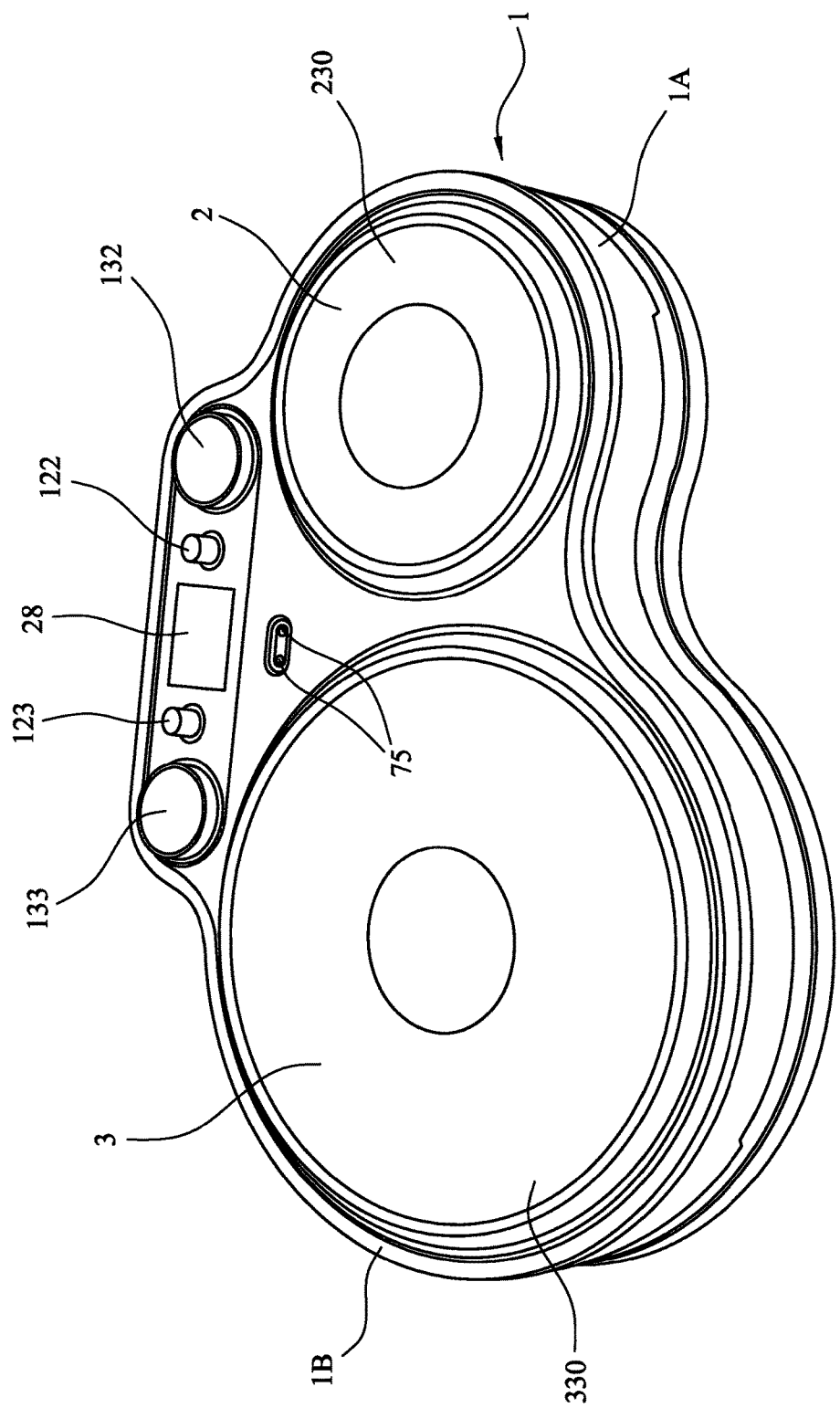
FIG. 5 is a perspective view of an electronic drum according to a second embodiment of the present invention in the form of a tabla.

Referring now to a second embodiment according to the present invention as shown in FIG. 5, there is provided an electronic drum comprising a housing 1 formed by a lower and upper housing members 1A, 1B held in cooperating engagement. The electronic drum comprises a first and second drum head assemblies 2, 3 mounted on the upper surface member 1B. In this embodiment, the first drum head assembly 2 is also smaller than the second drum head assembly 3 and the former comprises a treble drum head while the latter comprises a bass drum. The upper surface of the housing 1 further comprises two sets of dials consisting of a larger dial and a smaller dial arranged on each side of an LCD screen 28. The LCD screen 28 is arranged to provide a user interface for selecting and changing settings. One set of dials consists of a volume controller 122 and a tuning controller 132 for the treble drum 2 while the other set of dials consists of a volume controller 123 and a tuning controller 133 for the bass drum 3. An electrical connector 75 is also provided on the upper surface of the housing 1. In this embodiment, the drum head assemblies 2, 3 are fixed in relation to each other. Further, each drum head 2, 3 assembly comprises a sensor membrane which covers each entire drum head 2, 3. An example of a suitable sensor is described in US2011/0167992, the disclosure of which is incorporated herein by reference. Each sensor membrane is arranged to cover the entire drum head so as to detect the radial position and force of a stroke on the relevant drum head. In other words, the sensor used in this embodiment is capable of detecting a stroke anywhere in the drum head surface.

Figure 6A:
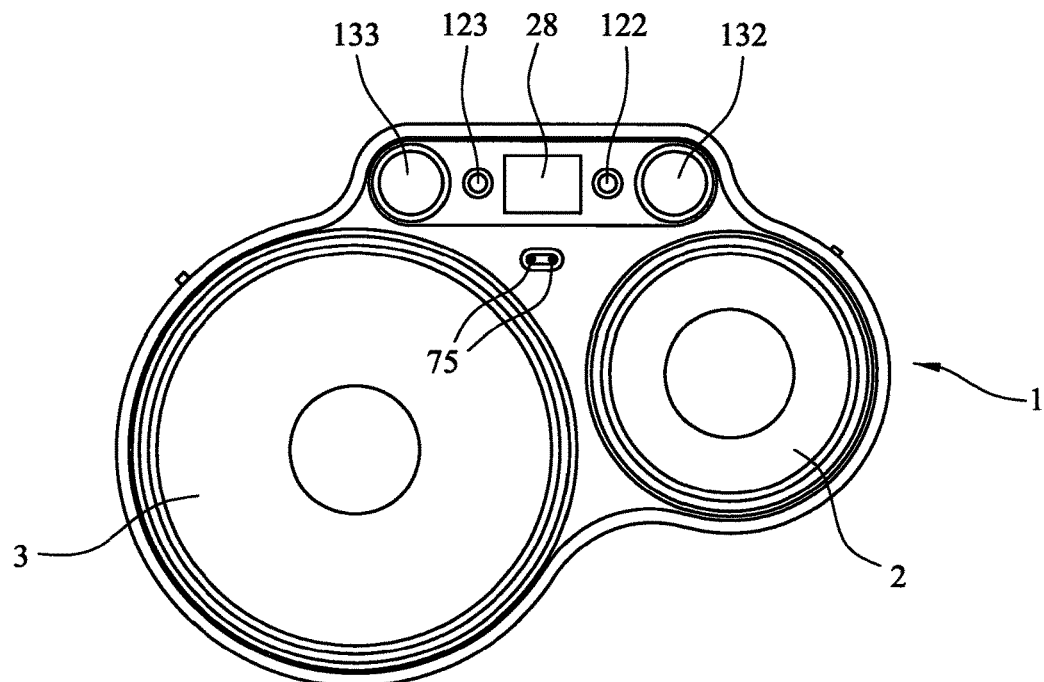
FIG. 6A is a plan view of the electronic drum of FIG. 5.

Referring now to FIG. 6A, a plan view, the housing 1 is roughly shaped as a figure of eight having a contiguous generally rectangular projection on the far side, that is, the side arranged to be remote from a player in use. The controllers 122, 123, 132, 133 and the LCD screen 28 are arranged on the rectangular projection. The electrical connector 75 is adjacent to the rectangular projection and on the same vertical axis of the LCD screen 28, i.e. below the LCD screen 28 in this plan view, between the portions of the drum heads 2, 3 which are remote from a player in use. The central portions of the drum heads 2, 3 are offset so that both drum heads 2, 3, are equidistant from the rectangular projection. As a result, the larger bass drum 3 protrudes from the proximate side, that is the side arranged to be closer to a player in use, relative to the treble drum 2. The profile of the housing 1 is contoured to enable the electronic drum to be approached with ease.

Figure 6B:
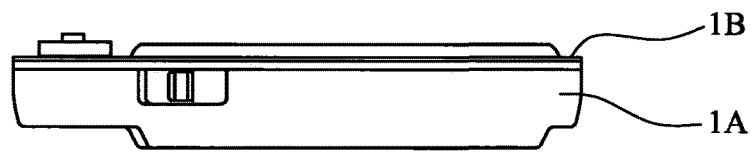
FIG. 6B is a side view of the electronic drum of FIG. 5.
Figure 6C:
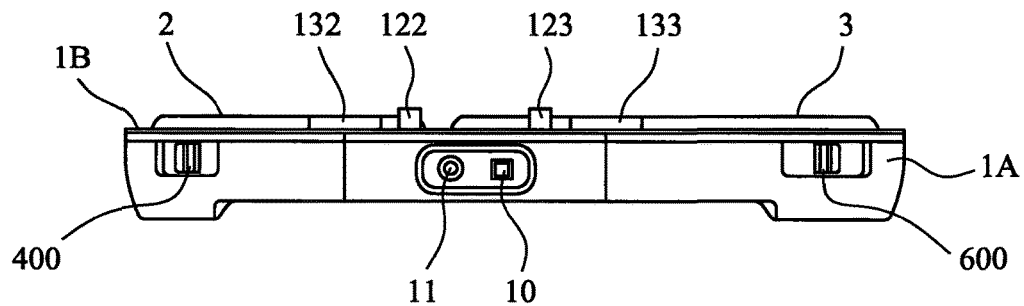
FIG. 6C is a back view of the electronic drum of FIG. 5.

Referring now to FIGS. 6B and 6C, the rear wall of the lower housing member 1A, that is the side wall of the rectangular projection arranged to be remote from a player in use, comprises a computer or Ethernet port 10 to facilitate connection to a computerised system and a headphone or speaker socket 11. Further, a pair of projecting arms 400, 600 one for each drum 2, 3 are provided to replace the levers described in relation to the first embodiment. These projecting arms 400, 600 are fixed and support the drum assembles 2, 3. Further, the projecting arms 400, 600 allow the same mechanism, housing and respective mouldings to be used for the first and second embodiments and is therefore more costs effective. Moreover, the projecting arms could be adapted as described below in relation to further embodiments.

Figure 7:
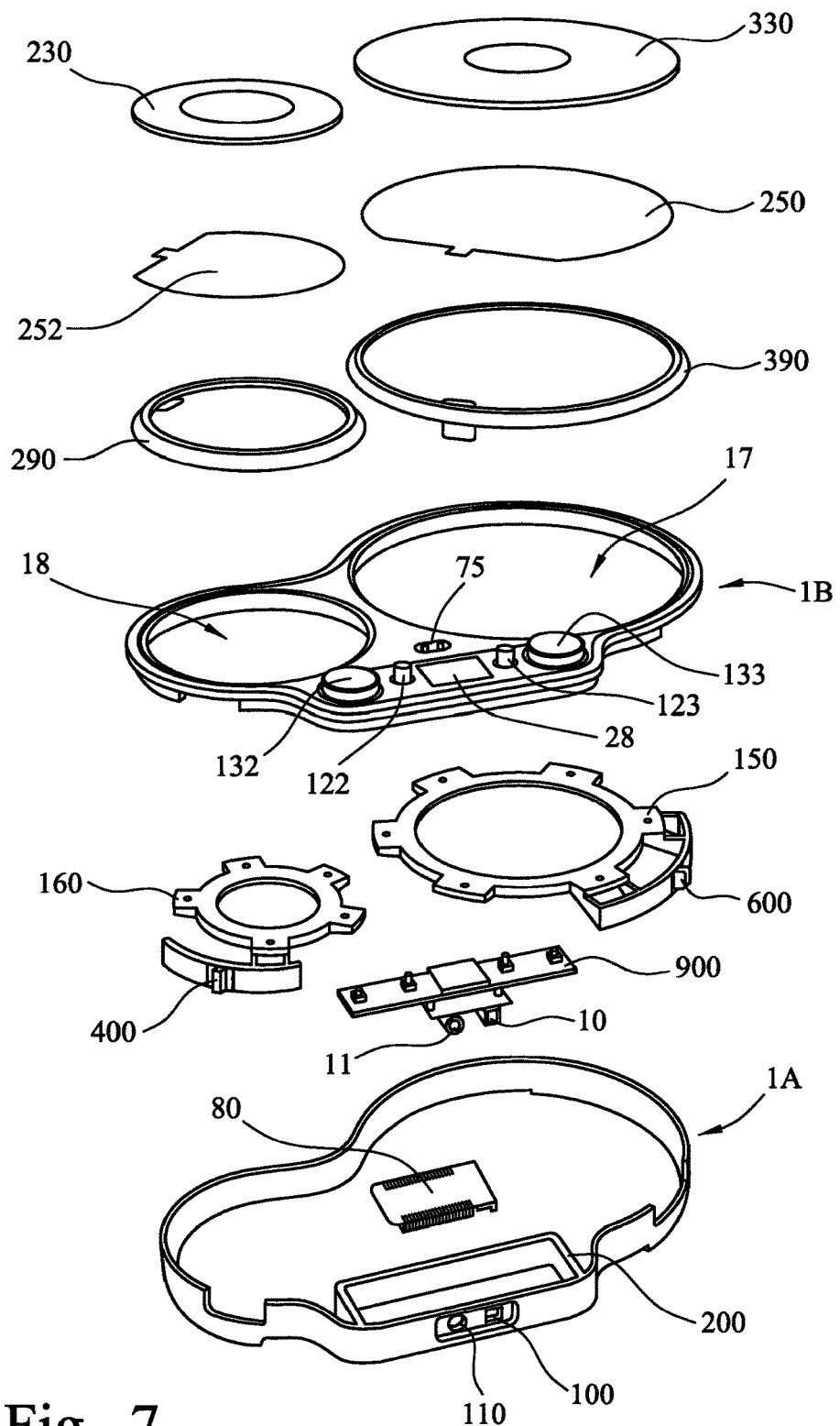
FIG. 7 is an exploded view of the electronic drum illustrated in FIG. 5.

As shown in FIG. 7, the lower housing member 1A is profiled to receive the drum heads 2, 3 and the rectangular projection. As in the previous embodiment, the lower housing member 1A comprises two indentations form the lower part of a pair of slots arranged to receive the projecting arms 400, 600. A first and second socket openings 100, 110 are provided in the rear wall of the lower housing member 1A to receive the computer port 10 and the headphone or speaker socket 11 respectively. A generally U-shaped internal wall 200 is provided in the lower housing member 1A to separate said lower housing member 1A into two portions: a first portion arranged to receive the drum heads and a second portion arranged to receive the electronic components and internal parts of the components arranged on the rectangular projection. When assembled, the second portion houses electrical components including, in order of arrangement, a single board micro-computer or processing unit 80, the computer 10 and the headphone or speaker socket 11 and a printed circuit board 900 which is connected to the computer 10 and the headphone or speaker socket 11. In this embodiment, the sound card is included in the processing unit. The electrical components fulfil essentially the same functions described in relation to the first embodiment. The printed circuit board 900 is slightly modified to be received in the second portion of the lower housing member 1A. The first portion of the lower housing member 1A receives a pair of fixed drum head positioning rings 150, 160. Each fixed drum head positioning ring 150, 160 is connected to a corresponding fixed projecting arm 400, 600. The projecting arms are received by the indentations on the lower housing member and by two corresponding indentations on the upper housing member 1A. As the drum positioning rings 150, 160 and the projecting arms 400, 600 are fixed in this embodiment, these integers remain stationary once the electronic drum is assembled. As in the previous embodiment, the upper face of the upper housing member 1B comprises a first opening 17 and a second opening 18 arranged to receive the drum heads 2, 3. Further, the edge of each wall defining the first and second openings 17, 18 also has a peripheral recess arranged to receive a damping ring 290, 390 in the form of a neoprene foam ring. As mentioned above in relation to FIGS. 5 and 6, the top face of the upper housing member comprises a rectangular projection. Controllers 122, 123, 132, 133 and LCD screen 28 are provided on the rectangular projection. Sensors 250, 252 are sensor membranes arranged form a drum head and detect the radial position and force of a stroke on the relevant drum head. Finally, the sensors are shielded by protective covers 230, 330. The protective covers 230, 330 provided in this embodiment comprise a central display which represents the central area of a traditional tabla.

In this embodiment, the sensors 250, 252 are used in conjunction with software to detect hand gestures thereby allowing the electronic drum to identify any given type of stroke performed by a player. In particular, sensors are able to detect stroke location and strength while the software is adapted to determine stroke duration in addition to stroke location and strength. As a result, the sound output is correlated to specific strokes and any sound effect produced by the player is reflected by the output thereby replicating the sound output of a traditional tabla. For example, an open sound is created by a user striking one of the drum heads 2, 3 with a finger and quickly removing said finger while a closed or muted sound is created by a user striking one of the drum heads 2, 3 with a finger or hand and leaving said finger or hand in contact with the drum head surface. In both examples, the location of the stroke may be the same while the duration of the stroke would be much shorter in the former example than in the latter; the strength and/or pressure would be lower if is exerted by a finger while higher if exerted by the palm of the hand. Further, pitch bending of a sound is produced by applying pressure to one of the drum heads 2, 3 with a finger or with the base portion or heel of the palm of a hand before or after the drum head 2, 3 has been struck. In other words, a relatively weak force is applied continuously or for a relatively long time before or after the drum is struck for a shorter time. On the other hand, pitch changing can be achieved by performing a sliding motion with a hand across the drum head 2, 3 surface after said drum head surface has been struck, that is, the pitch of a stroke may be changed by performing a relatively long lasting sliding movement on the drum while applying pressure soon after the drum is struck for a shorter time.

Figure 8:
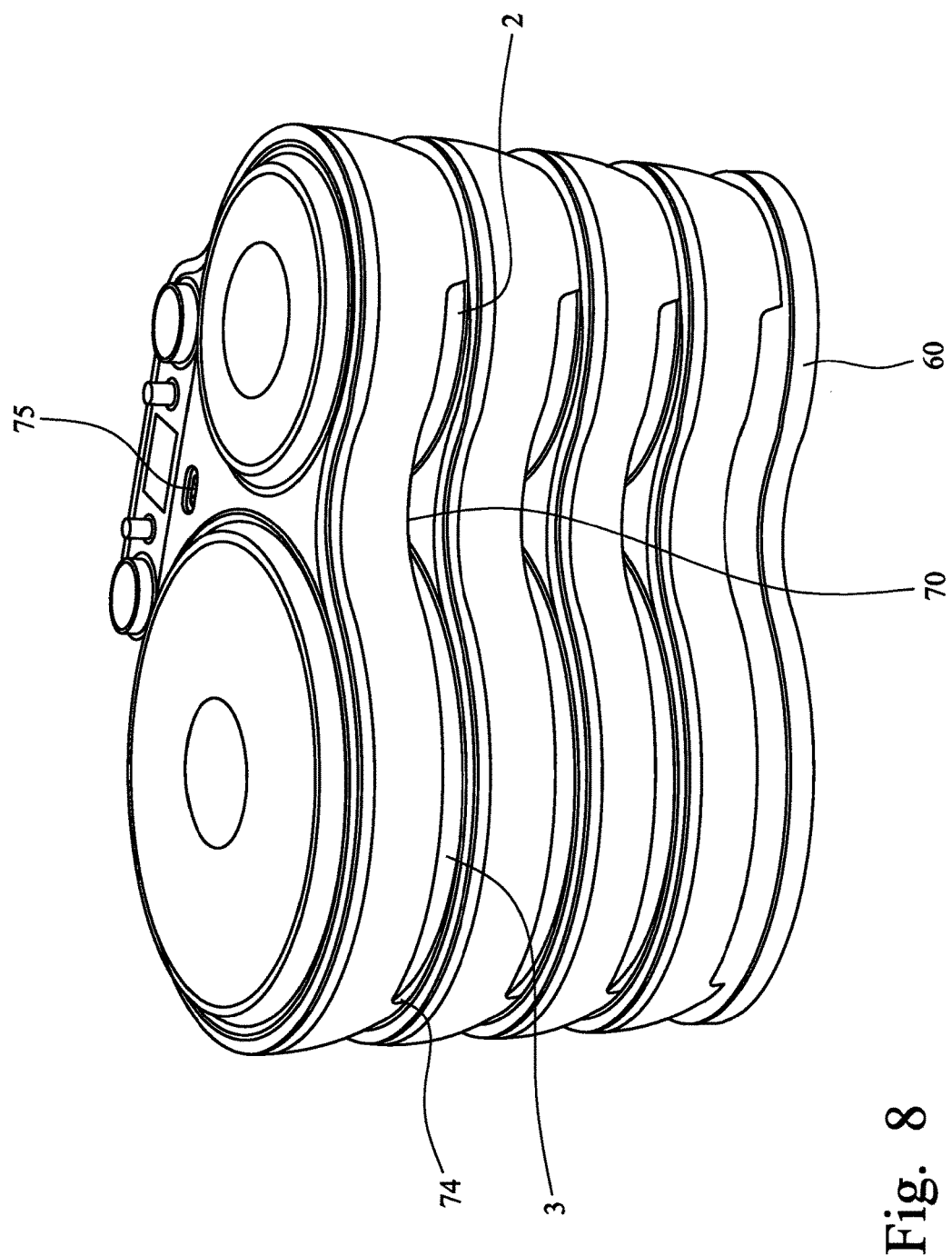
FIG. 8 is a perspective view of a plurality of electronic drums in accordance with the a third embodiment of the present invention.
Figure 9:
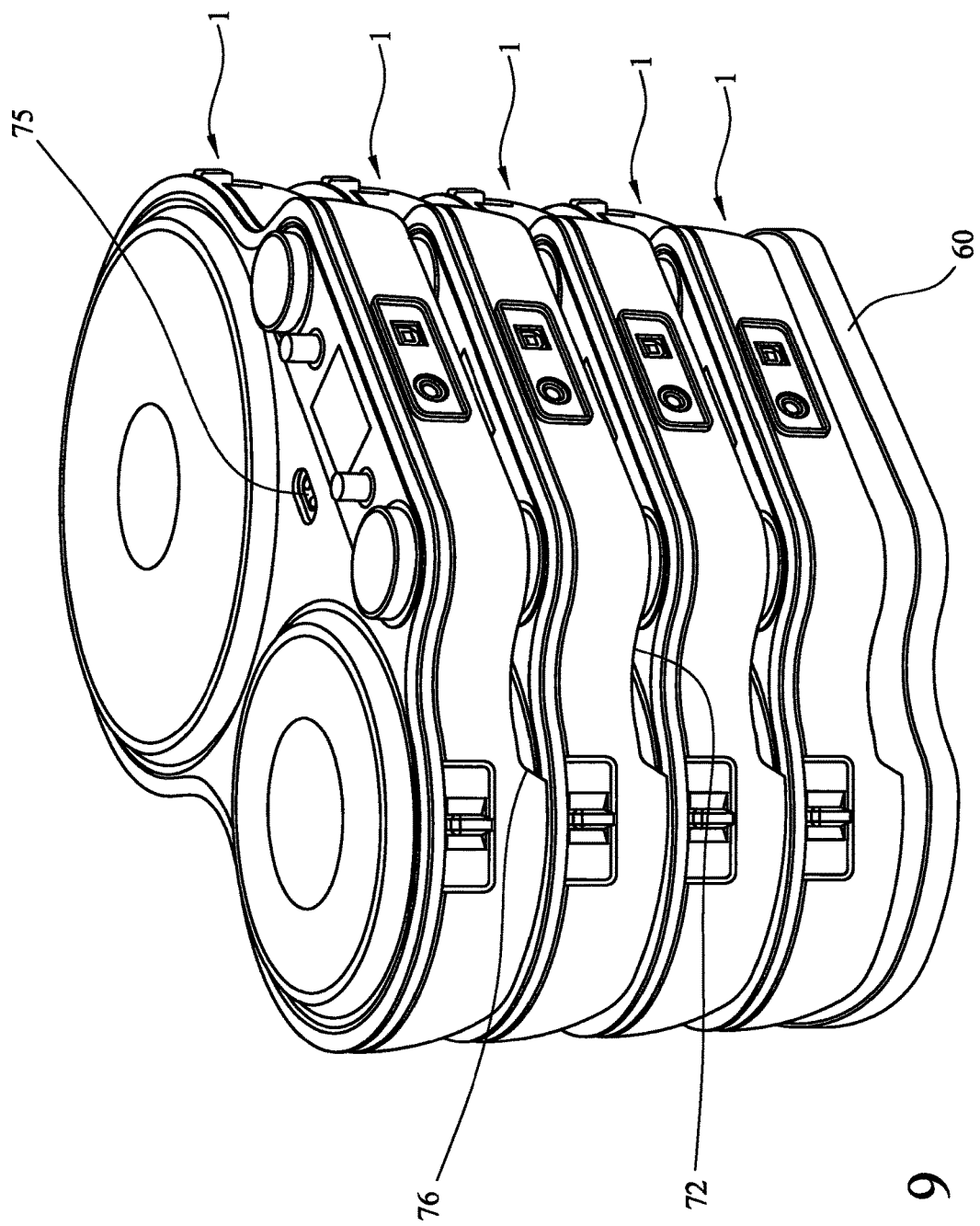
FIG. 9 is a back view of the plurality of electronic drums illustrated in FIG. 8.

Referring now to FIGS. 8 and 9, there is shown a plurality of electronic drums according to a third embodiment of the present invention. In this embodiment, each drum is generally as described in relation to FIGS. 5 to 7 but, in addition, it comprises a rechargeable battery (not shown) and a further electrical connector (not shown) on the exterior surface of the base of the lower housing member 1A, the further electrical connector is arranged to be engage an electrical connector 75 on another electronic drum to enable electrical connection between at least two electronic drums and electrical connection between an electronic drum and a base station 60 arranged to charge one or more rechargeable batteries. This arrangement enables a plurality of drums to be stacked over and recharged by a single base station which is physically in connect with only one electronic drum. Further, the plurality of drums can be recharged by using a single power source or supply. Specifically, the base station 60 has a plug (not shown) connectable to a power source and is designed to be electrically connectable to an electronic drum or a stack of electronic drums so that the rechargeable battery in each electronic drum is recharged via the power supply connected to the base station 60. As shown in these figures, the lower housing member 1A of each electronic drum may also comprise a first contoured recess 70 arranged to receive the contoured front side of another electronic drum or a base station arranged underneath and a second recess 72 arranged to accommodate the drum controllers. Each side portion of the lower housing member 1A thereby forms a contoured support member 74, 76.

In an alternative embodiment to that described in respect of FIGS. 5 to 7, the projecting arms could be adapted to be pivotable as in the first embodiment.

In a further embodiment (not shown), the sensors are used in conjunction with a single board computer, such as a BEAGLEBONE BLACK® or RASPBERRY PI®, to calculate where and how hard a drum head has been struck. This information is used to trigger a range of recorded samples or computer synthesised sounds depending on where and how the drum was hit.

In another embodiment of the present invention (not shown), the drum head assemblies comprise a sensor as the one described above in relation to the second embodiment. However, the drum head surfaces are divided into virtual trigger zones by adjusting software variables. These size and shape of these virtual trigger zones can be adjusted by changing software variables. In a further embodiment, the virtual trigger zones may be illuminated individually with LCD lights on or under the sensor to indicate the layout and size of each separate zone. In another embodiment, the virtual trigger zones are illuminated in a sequence controlled by the microprocessor to help a user learn which zones to strike and when. These lights could be mounted on the positioning rings, levers or projecting arms.

Alternatively, in an embodiment comprising sensors having physical triggers zones, the drum heads may be provided with a light or lights arranged to illuminate sensor trigger zones which visually indicate where a user should strike the drum. In another embodiment, the entire drum head may be provided with sensors and a corresponding sensor trigger zone or an unmarked protective cover to fully replicate a traditional tabla. These lights could be mounted on the positioning rings, levers or projecting arms. In addition, the drum heads may be provided with educational overlay stickers demarking different playing zones by using different colours or with different stickers to allow personalisation for different colour preferences. Moreover, a sticker having braille writing could be provided for blind or partially sighted users.

Moreover, an electronic drum according to the present invention could be provided with a flexible drum head which allows the electronic drum to be rolled up for easy storage and transport. Although the drum assemblies have been described as being housing in a single unit, it should be clear to the skilled person that each drum assembly may be included in a separate housing and connected with a cable or wirelessly.

In a further embodiment of the invention, the sensors may be adapted to measure position and power of each beat. This feature would enable players to improve playing skills and become more self-aware. This aspect of the invention could be incorporated into a functionality which allows game play in a manner similar to GUITAR HERO®. For example, a full HD screen may be provided to allow capacitive touch sensors to indicate which trigger zones and dynamic patterns are being produced by each user. In addition, if this feature is present, it would also be possible to have an online interactive user community to allow users to play, teach and learn using an internet connection.

In a further development, the contact zones on the drum head may be excluded in a predetermined sequence to indicate which position on the user should hit next.

Although the sensors used in respect of the second embodiment are as described in US2011/0167992, any other suitable type of sensor could be used. Further, it should be clear that the sensor of the second embodiment or any other suitable sensor or sensors could also be used in the first embodiment.

It should be noted that as the set of drums is electronic, headphones, speakers and/or amplifiers can be connected to the device to allow users to practice quietly or amplify sound as appropriate. Alternatively, speakers may be in-built into the electronic drum. In addition, the computer port described above could be replaced with an alternative, omitted or an additional port could be provided. For example, the electronic drum may be connected to a computer via a USB port or wirelessly; this feature would allow a player to use for recording and composing software. An Ethernet port for connection to computer and internet may also be provided.

Although the controllers have been described as regulating volume and pitch tuning, it should be clear that, for example in the second embodiment, the larger controller in a set of dials could be used to perform pitch tuning of the relevant drum while the smaller dial could be used to fine tune said drum to allow the electronic drum to be used with other instruments. In this alternative embodiment, the LCD screen could be a touch screen comprising a volume control.

It should be clear that any embodiment of the present invention may be designed to be placed in a stack for easy storage.

In another embodiment, the drum heads may be motorised so that the rotation of the drum heads is electronically controlled. In a further development of this embodiment, the electronic drum may be provided with a CPU programmed to, for example, remember positioning of the drum heads for specific users.

Additionally, the CPU may be programmed to allow users to use the instrument in three different difficulty settings: novice, intermediate and expert. A variety of protective covers may be provided to fit on the drum head giving for example different styles and complexity to accommodate novice players, intermediate and professional users. Moreover, an RFID tag may be used to set and remember system preferences based on skill level.

It should be clear to the skilled person that although the present invention has been described as having the bass drum on the left when the controls are remote from a user, i.e. the electronic drum version shown is for use by right-handed users, a mirror image version may be produced for left-handed users.

The present invention is also suitable to be used as a midi drum pad when connected to another midi device such as a midi Sound Module or similar sound source which allows it to trigger other sounds. The midi interface also allows connection to a computer for use with a DAW (Digital Audio Workstation) such as, for example, LOGIC PRO®, PRO-TOOLS® and DIGITAL PERFORMER® in addition to composer writing software such as SIBELIUS®.

It is envisaged that the electronic instrument of the present invention may be provided with a motor which allows the drum heads to be tilted, that is moved in relation to the horizontal axis. Further, a drum set could be provided with a suitable arrangement of pivots located on the X and/or Y axis of each drum head. Additionally, the drum assemblies could be installed at an angle from the horizontal plane, in this case, the upper housing member and/or the dampening rings could be sloped.

The electronic drum of the present invention may be provided with an attachable music stand and/or a stand arranged to allow a player to sit on a surface such as the floor and play the electronic device in the same way a traditional tabla would be played or to allow the user to play the drum set whilst standing. Any of the aforementioned stands may be adjustable. A further adjustable knee pad platform may also be provided. In addition, the electronic device may be equipped with fittings to allow a shoulder strap to be attached.

The invention claimed is:

1. An electronic percussion instrument comprising:
   two drum assemblies (2, 3) of differing tone, each drum assembly (2, 3) mounted on a housing (1), each drum assembly (2, 3) comprising a drum head (2, 3) having a sensor (25, 32-35, 250, 252) responsive to at least one of touch and pressure and an analog-to-digital converter arranged to generate an electronic signal indicative of said at least one of touch and pressure;
   a processing unit (80) arranged to analyse the electronic signal and generate an output signal; and
   a sound card (50) arranged to reproduce a sound representative of a drumbeat based on the output signal;
   wherein the sensor (25, 32-35, 250, 252) and processing unit (80) are arranged to detect a location, duration, and strength of said at least one of touch and pressure, thereby allowing the electronic percussion instrument to identify any type of stroke performed by a player;
   the output signal is correlated to specific strokes enabling any sound effect performed on the drum assemblies to be reflected by the sound reproduced by the sound card (50) and allow at least one of pitch bending and pitch changing in response to touch or pressure being applied on either drum assembly (2,3).

2. The electronic percussion instrument according to claim 1, wherein the sensor (250, 252) is a sensor membrane arranged to cover the drum head (2, 3) so as to detect the radial position and force of a stroke on the drum head (2, 3).

3. The electronic percussion instrument according to claim 1, wherein the drum head (2, 3) comprises a protective cover (23, 33) having displays which define sensor trigger zones, and wherein the sensor (25, 32-35, 250, 252) is demarcated by said sensor trigger zones.

4. The electronic percussion instrument according to claim 3, wherein one of the drum heads further comprises at least one further sensor (32-34), and wherein the further sensor (32-34) is demarcated by further sensor trigger zones.

5. The electronic percussion instrument according to claim 1, wherein the processing unit (80) comprises software adapted to analyse at least one of a location, force, and duration of a stroke detected by the sensor or sensors (25, 32-35, 250, 252).

6. The electronic percussion instrument according to claim 1, wherein the drum assemblies (2, 3) are physically interconnected.

7. The electronic percussion instrument according to claim 6, wherein the percussion instrument further comprises a housing (1) arranged to receive the two drum assemblies (2, 3) and form an integral unit.

8. The electronic percussion instrument according to claim 1, wherein the drum assemblies (2, 3) are interconnected by a wireless connection.

9. The electronic percussion instrument according to claim 1, wherein the drum heads are pivotable about a substantially vertical axis relative to the drum assemblies (2, 3) to enable the position of the touch sensitive areas to be moved relative to a user.

10. The electronic percussion instrument according to claim 1, wherein the drum heads are at an angle from the horizontal plane.

11. The electronic percussion instrument according to claim 1, wherein the pitch of the electronic signal is adjustable to allow the sound to be reproduced in a selected one of different keys.

12. The electronic percussion instrument according to claim 1, further comprising outlet ports (10, 11) for connecting the output of the electronic signals to headphones, loudspeakers, a computer, a memory card or a network.

13. The electronic percussion instrument according to claim 1, further comprising a rechargeable battery and an electrical connector arranged to enable the percussion instrument to be connected to a base station (60) or a second percussion instrument.

14. The electronic percussion instrument according to claim 1, and further comprising a base station (60) having an electrical connector arranged to be connected with the electronic percussion instrument.

* * * * *